April 29, 1930.  C. A. IVES  1,756,922
BRAKE SYSTEM
Filed Sept. 28, 1926
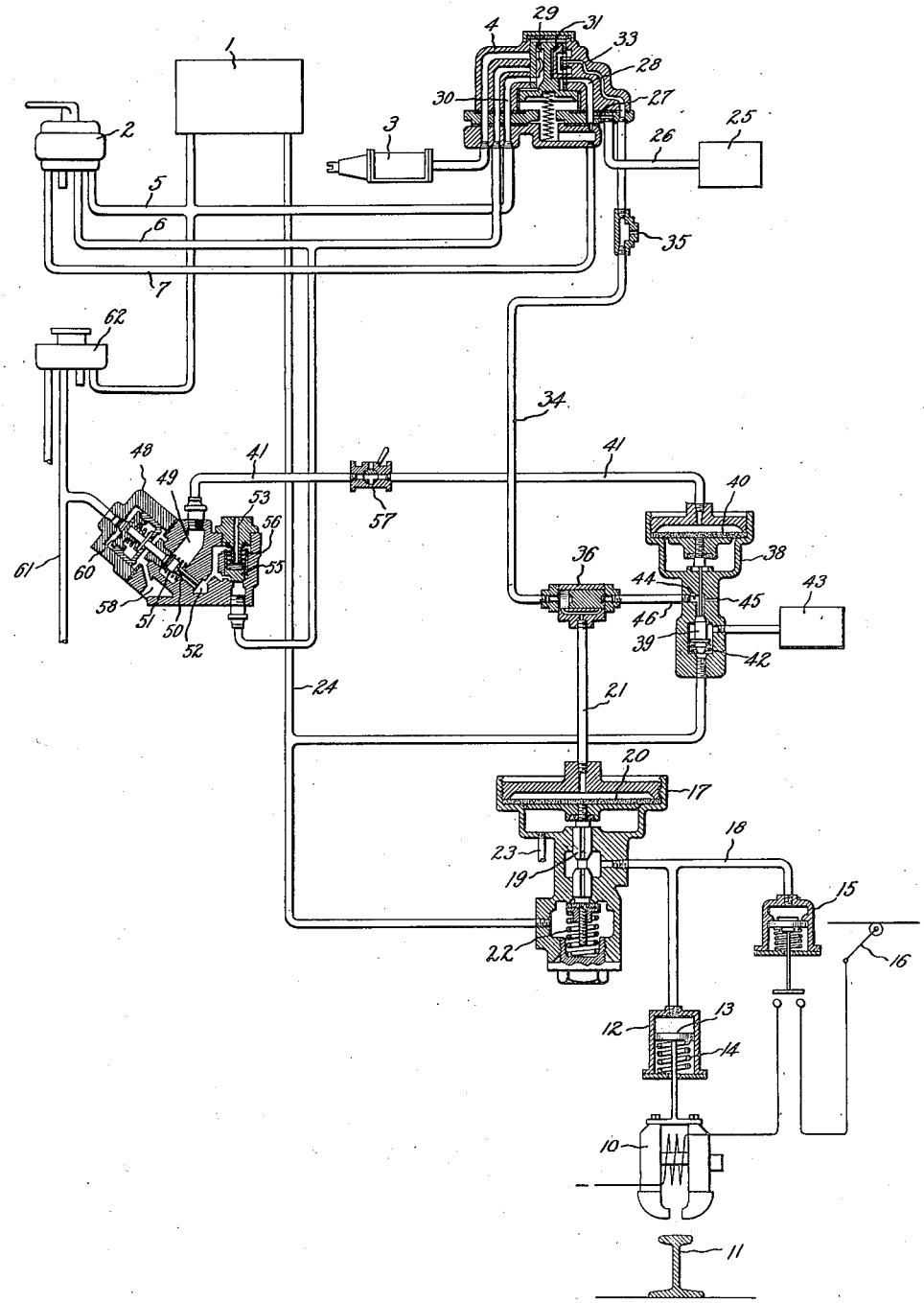
Inventor:
Charles A. Ives,
by
His Attorney.

Patented Apr. 29, 1930

1,756,922

UNITED STATES PATENT OFFICE

CHARLES A. IVES, OF ERIE, PENNSYLVANIA, ASSIGNOR TO GENERAL ELECTRIC COMPANY, A CORPORATION OF NEW YORK

BRAKE SYSTEM

Application filed September 28, 1926. Serial No. 138,160.

My invention relates to brake systems, and particularly to combined wheel and track brake systems, and its object is to provide an improved control arrangement for the track brakes whereby they may be operated to assist the wheel brakes under certain conditions thereof.

In accordance with my invention, I provide an arrangement whereby the track brakes may be applied at the will of the operator, when a predetermined service application of a straight air wheel brake system is made. Means are also provided whereby the track brakes are automatically released if they are on at the time the car doors are opened.

My invention will be better understood from the following description, taken in connection with the accompanying drawing, which is a diagram partially in section of a combined straight air wheel brake with emergency feature and magnetic track brake system, and its scope will be pointed out in the appended claims.

While my invention is applicable to various types of air brake systems, examples of which are well known in the art, I have preferred to show my invention in the accompanying drawing in connection with a well known type of straight air brake system with emergency feature. This type of straight air brake system comprises a main reservoir 1, a brake valve 2, a brake cylinder 3, an emergency valve 4, a main reservoir pipe 5, a straight air pipe 6 and an emergency pipe 7. As is well known in the art, the emergency valve 4 is normally maintained in the position shown, in which position the straight air pipe 6 is in communication with the brake cylinder 3. Therefore, a straight air application of the brakes may be effected by moving the brake valve 2 so that it establishes communication between the main reservoir pipe 5 and the straight air pipe 6, and the brakes may be released after a straight air application by moving the brake valve 2 so that it establishes communication between the straight air pipe 6 and atmosphere. The emergency valve 4, which may be of any suitable type, examples of which are well known in the art, is also arranged to close communication between the brake cylinder 3 and the straight air pipe 6 and to open communication between the brake cylinder 3 and the main reservoir pipe 5 so as to effect an emergency application of the brakes when a sudden reduction in the fluid pressure in the emergency pipe 7 occurs.

The magnetic track brake system comprises a magnetic track brake 10 which may be of any suitable construction, examples of which are well known in the art. Preferably the track brake is normally carried out of operative relation with the track 11 so that there is sufficient clearance to prevent small articles that may be on the track from being caught between the track and brake. Any suitable means may be employed for moving the magnetic track brake into operative relation with the track. As shown in the drawing a fluid pressure cylinder 12, containing a piston secured to the brake 10 and an opposing spring 14 is provided for moving the magnetic track brake 10 into and out of operative relation with the track 11. A fluid pressure operated switch 15, which may be of any suitable construction, examples of which are well known in the art, is also provided for controlling the energizing circuit of the brake 10. The winding of the brake 10 may be energized from any suitable source of current. As shown in the drawing the switch 15, when closed, connects the brake winding directly to the trolley 16.

For effecting the operation of the magnetic track brake 10 when an emergency application of the air brakes is made, I have disclosed the arrangement disclosed and claimed in the co-pending application of George Macloskie and myself, Serial No. 138,159 filed concurrently herewith and assigned to the assignee of this application.

This arrangement comprises a fluid pressure operated relay valve 17 which is operated for a certain length of time whenever an emergency application of the brakes is made to establish communication between a pipe 18, through which fluid pressure is supplied to the cylinder 12 and switch 15, and the main reservoir 1. The relay valve 17 comprises a double beat valve 19 which is adapted to be operated by a diaphragm 20, one side of which is subject to the pressure in a pipe 21. When there is no fluid pressure in the pipe 21, the double beat valve 19 is held in the position shown by a spring 22 so that it establishes communication between the pipe 18 and a pipe 23 leading to atmosphere. When, however, fluid pressure is supplied to the pipe 21, the diaphragm is moved downwardly so that the double beat valve 19 is operated to close communication between pipe 18 and atmosphere and to open communication between pipe 18 and pipe 24 which is connected to the main reservoir 1.

In order that fluid pressure may be supplied to the pipe 21 to effect the operation of the magnetic track brake 10 when an emergency application of the air brakes is made, the emergency valve 4 is arranged so that when it is in its normal position it connects an auxiliary reservoir 25 to the main reservoir pipe 5 by means of a pipe 26, passages 27 and 28, valve chamber 29 and passage 30 so that the auxiliary reservoir 25 is normally charged with fluid pressure. When the emergency valve 4 is in its emergency position, its slide valve 31 closes communication between passage 28 and the valve chamber 29 and opens communication between passage 28 and passage 33, which is connected to the pipe 21 by means of a pipe 34 and a double check valve 36.

In order that the track brake will remain operated for only a predetermined time after an emergency application of the air brakes has been made, the pipe 34 is provided with a relatively small opening 35 to atmosphere so that after a predetermined time the fluid pressure in the auxiliary reservoir 25 becomes exhausted and the relay valve 17 is restored to its normal position by the spring 22. If desirable, the fluid pressure that escapes through the opening 35 may be used for any suitable purpose such as sanding the track.

In accordance with my invention I provide an arrangement whereby the magnetic track brake 10 may be operated at the will of the operator whenever a predetermined service application of the air brakes is made. For accomplishing this result, I provide a suitable device, shown as a fluid pressure operated relay valve 38, which is so arranged that it may operated when the fluid pressure in the straight air pipe 6 exceeds a predetermined value to supply fluid pressure to the pipe 21 leading to the relay valve 17. The relay valve 38 comprises a double beat valve 39 which is adapted to be operated by a diaphragm 40, one side of which is subject to the pressure in a pipe 41. When there is no fluid pressure in the pipe 41 the double beat valve 39 is maintained in the position shown by a spring 42 so that it establishes communication between an auxiliary reservoir 43 and the pipe 24 leading to the main reservoir to maintain the auxiliary reservoir charged with fluid pressure. When, however, the pipe 41 is supplied with fluid pressure, the diaphragm 40 is moved downwardly so that the double beat valve 39 is operated to cut off communication between the auxiliary reservoir 43 and the main reservoir pipe 24 and to establish communication between the auxiliary reservoir 43 and a passage 44 which is connected through a restricted port 45 to atmosphere and to a pipe 46 leading to the double check valve 36, which may be of any suitably construction, examples of which are well-known in the art. The double check valve is arranged so that when fluid pressure is supplied to either pipe 34 or 46, it moves to establish communication between the pipe that is supplied with fluid pressure and pipe 21 and to cut off communication between pipe 21 and the other pipe which is connected to atmosphere.

In order that the pipe 41 leading to the relay valve 38 may be supplied with fluid pressure when a straight air application of the air brakes is made, a valve device 48 is provided which is arranged to connect the pipe 41 to atmosphere when the pressure in the straight air pipe 6 is below a predetermined value and to supply fluid pressure from the straight air pipe 6 to the pipe 41 when the pressure in the straight air pipe is above a predetermined value. The pipe 41 is normally in communication with atmosphere through passage 49, double beat valve 50, which is normally held off its seat by spring 51, passage 52 and exhaust port 53. The valve device 48 also comprises a valve 55 which is normally held on its seat by a spring 56 and which is arranged to be operated by fluid pressure in the straight air pipe 6 whenever it is above a predetermined value to establish communication between the straight air pipe and the passage 52 and to cut off communication between passage 52 and the exhaust port 53, so that fluid pressure is supplied to the pipe 41 to effect the operation of the magnetic track brake 10.

In order that the operator may prevent, if he so desires, the operation of the magnetic track brake when a straight air application of the air brakes is made, a suitable manually operated valve 57 is provided in the pipe 41. As shown in the drawing, the valve 57 is shown as a three way cut off valve. The valve 57, when in the position shown, establishes communication between both sections of the pipe 41. When turned to its closed position, however, it cuts off communication between the two sections of the pipe 41 and establishes communication between atmosphere and the section of the pipe 41 which is connected to the relay valve 38.

In order that the magnetic track brake may be released as soon as the car has stopped and the car doors have been opened, I provide an arrangement whereby the double beat valve 50 is operated to close communication between passages 49 and 52 and to open communication between passage 49 and a passage 58, connected to atmosphere, whenever the doors are opened. For accomplishing this result I provide a piston 60 which is arranged to be operated whenever fluid pressure is supplied to the door opening pipe 61 which may be connected to any suitable door engine, not shown, examples of which are well known in the art. The piston 60 is arranged to move the double beat valve 50 against the action of the spring 51 so that communication is cut off between pipe 41 and the straight air pipe 6 and communication is established between pipe 41 and atmosphere. The venting of fluid pressure from the pipe 41 causes the relay valves 38 and 17 to be restored to their normal positions so that the magnetic track brake 10 is released.

The supply of fluid pressure to the door opening pipe 61 so as to effect the opening of the doors may be controlled by any suitable means, examples of which are well known in the art. I have shown a separate door valve 62 for controlling communication between the main reservoir 1 and the door opening pipe 61 but it is obvious that my invention is not limited to such an arrangement.

The operation of the arrangement shown is as follows: When the air brakes are off the various devices are in the positions shown.

When an emergency application of the air brakes is made so that the emergency valve is moved into its emergency position, the slide valve 31 operates to disconnect the auxiliary reservoir 25 from the main reservoir pipe 5 and to establish communication between the auxiliary reservoir 25 and the pipe 34. If the check valve 36 is not already in the position shown, in which it establishes communication between pipes 34 and 21 and cuts off communication between pipes 46 and 21, the fluid pressure in the pipe 34 will move it to this position. As soon as the fluid pressure in the pipe 21 builds up to a predetermined value the diaphragm 20 of the relay valve 17 moves downwardly so that the double beat valve 19 is operated to close communication between pipes 18 and 23 and to open communication between pipes 18 and 24. Fluid pressure is then supplied from the main reservoir 1 to the cylinder 13 and the switch 15 so that the magnetic track brake 10 is moved into operative relation with the track 11 and is supplied with current from the trolley 16.

After a predetermined time, which is determined by the size of the opening 35, the amount of fluid pressure in the auxiliary reservoir 25 and pipes 34 and 21 becomes insufficient to maintain the relay valve 17 in its operated position. The spring 22 then restores the relay valve 17 to its normal position in which position communication is reestablished between pipes 18 and 23 so that the magnetic track brake 10 is deenergized and moved out of operative relation with the track.

As soon as the emergency valve 4 is restored to its normal position after an emergency application of the air brakes, the auxiliary reservoir 25 is reconnected to the main reservoir 5 and is recharged with fluid pressure.

When a straight air application of the air brakes is made, the valve 55 is operated when the pressure in the straight air pipe 6 reaches a predetermined value to cut off communication between pipe 41 and atmosphere and to establish communication between the straight air pipe 6 and pipe 41. If the cut off valve 57 is open, the fluid pressure in the pipe 41 causes the diaphragm 40 of the relay valve 38 to move downwardly so that the double beat valve 39 is operated to close communication between auxiliary reservoir 43 and reservoir pipe 24 and to open communication between auxiliary reservoir 43 and pipe 46 and between the auxiliary reservoir 43 and the exhaust port 45. Fluid pressure in pipe 46 causes the double check valve 36 to move toward the left so as to cut off communication between pipes 21 and 34 and to establish communication between pipes 21 and 46 so that the relay valve 17 operates in the manner heretofore described to effect the operation of the magnetic track valve 10.

If the air brakes remain applied for a predetermined length of time the magnetic track brake 10 is released due to the fact that the amount of fluid pressure in the auxiliary reservoir 43 becomes insufficient to maintain the relay valve 17 in its operated position. The spring 22 then restores the valve 17 to its normal position, in which position communication is reestablished between pipes 18 and 23 so that the magnetic track brake 10 is deenergized and moved out of operative relation with the track.

If the straight air brakes are released so that the valve 55 is restored to its normal position before the pressure in auxiliary reservoir 43 is reduced sufficiently to cause the relay valve 17 to be restored to its normal position, the valve 55 reconnects the pipe 41 to atmosphere through exhaust port 53 so that the relay valve 40 is restored to its normal position by the spring 42 in which position communication is reestablished between the auxiliary reservoir 43 and the main reservoir pipe 24 and communication is cut off between the auxiliary reservoir 43 and pipe 46. The fluid pressure in pipes 21 and 46 is exhausted to atmosphere through exhaust port 45 so that the relay valve 17 is restored to its normal position and the magnetic track brake 10 is released in the manner above described.

Also, if the car doors are opened before the pressure in the auxiliary reservoir 43 is reduced sufficiently to cause the relay valve 38 to be restored to its normal position, the fluid pressure which is supplied to the door engine (not shown) through the door opening pipe to effect the opening of the car doors operates the piston 60 which moves the double beat valve 50 so that it cuts off communication between the straight air pipe 6 and the pipe 41 and establishes communication between the pipe 41 and atmosphere. The relay valve 38 is then restored to its normal position and effects the release of the magnetic track brake 10 in the manner above described.

If the operator does not want the track brake to be applied when he makes a service application or desires to effect an immediate release of the track brakes at any time without opening the doors or releasing the air brakes, he moves the cut off valve 57 to its off position so that communication is cut off between both sections of the pipe 41 and the section leading to the relay valve 38 is connected to atmosphere. Consequently fluid pressure cannot be supplied to the relay valve 38 to effect the application of the magnetic track valve 10 when a straight air application of the air brakes is made.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:—

1. In combination, an air brake system comprising a straight air pipe, a magnetic track brake, and means responsive to a predetermined pressure in said straight air pipe for effecting the energization of said magnetic track brake.

2. In combination, an air brake system comprising a straight air pipe, a magnetic track brake, and means responsive to a predetermined pressure in said straight air pipe for effecting the energization of said magnetic track brake for a predetermined length of time.

3. In combination, an air brake system comprising a straight air pipe, a magnetic track brake normally out of operative relation with the track, means responsive to a predetermined pressure in said straight air pipe for effecting the movement of said track brake into operative relation with the track, and means for energizing said magnetic track brake.

4. In combination, an air brake system comprising a straight air pipe, a magnetic track brake normally out of operative relation with the track, means responsive to a predetermined pressure in said straight air pipe for maintaining said track brake in operative relation with the track for a predetermined length of time, and means for energizing said magnetic track brake.

5. In combination, a straight air brake system comprising a straight air pipe, a source of fluid pressure, a magnetic track brake, fluid pressure operated switching means, and means responsive to a predetermined pressure in said straight air pipe for controlling communication between said source and said switching means whereby said fluid pressure operated means is operated to effect the energization of said magnetic track brake.

6. In combination, a straight air brake system comprising a straight air pipe, a source of fluid pressure, a track brake normally out of operative relation with the track, fluid pressure operated means for moving said track brake into operative relation with the track, and means responsive to a predetermined pressure in said straight air pipe for controlling communication between said source and said fluid pressure operated means whereby said last mentioned means is operated to move said track brake into operative relation with the track.

7. In combination, a straight air brake system comprising a straight air pipe, a magnetic track brake, a main reservoir, an auxiliary reservoir normally in communication with said main reservoir, fluid operated means arranged to effect the energization of said magnetic track brake, and means responsive to a predetermined pressure in said straight air pipe for cutting off communication between said auxiliary reservoir and said main reservoir and for establishing communication between said auxiliary reservoir and said fluid operated means and between said auxiliary reservoir and atmosphere whereby said fluid operated means is operated to effect the energization of said magnetic track brake for a predetermined length of time.

8. In combination, a straight air brake system comprising a straight air pipe, track brake normally out of operative relation with the track, a main reservoir, an auxiliary reservoir normally in communication with said main reservoir, fluid operated means arranged to effect the movement of said track brake into operative relation with the track, and means responsive to a predetermined pressure in said straight air pipe for cutting off communication between said main reservoir and for establishing communication between said auxiliary reservoir, said fluid operated means, and atmosphere, whereby said fluid operated means is operated to effect the movement of said track brake into operative relation with the track and maintain it in said operative relation for a predetermined length of time.

9. In combination, a straight air brake system provided with emergency feature, a track brake, two fluid pressure reservoirs, a fluid pressure operated means for controlling the operation of said track brake, means arranged to establish communication between one of said reservoirs and said pressure operated means to effect the operation thereof when an emergency application of the air brakes is made, and means arranged to establish communication between the other reservoir and said pressure operated means to effect the operation thereof when a straight air application of the air brakes is made.

10. In combination, a straight air brake system provided with emergency feature, a track brake, two fluid pressure reservoirs, a fluid pressure operated means for controlling the operation of said track brake, means arranged to establish communication between one of said reservoirs and said pressure operated means to effect the operation thereof when an emergency application of the air brakes is made, means arranged to establish communication between the other reservoir and said pressure operated means to effect the operation thereof when a straight air application of the air brakes is made, and means for closing the communication through which one of said reservoirs supplies fluid pressure to said fluid pressure operated means when communication is established between the other reservoir and said fluid pressure operated means.

11. In combination, a straight air brake system provided with emergency feature, a track brake, two fluid pressure reservoirs, a fluid pressure operated means for controlling the operation of said track brake, means arranged to establish communication between one of said reservoirs and said pressure operated means to effect the operation thereof when an emergency application of the air brakes is made, means arranged to establish communication between the other reservoir and said pressure operated means to effcet the operation thereof when a straight air application of the air brakes is made, and a double check valve connected between said reservoir and said fluid pressure operated means and arranged whenever one of the reservoirs is supplying fluid pressure to said fluid operated means to close the communication through which the other reservoir supplies fluid pressure thereto.

12. In combination, a track brake, fluid pressure operated means adapted to control the operation of said brake, two pipes, means arranged to be operated to cause fluid pressure to be supplied through one of said pipes to said fluid pressure operated means to effect the operation thereof, means arranged to be operated to cause fluid pressure to be supplied through the other of said pipes to said fluid pressure operated means to effect the operation thereof, and means for closing the communication between one of said pipes and said fluid operated means when fluid pressure is being supplied to said fluid operated means through the other pipe.

13. In combiantion, a straight air brake system provided with emergency feature, a track brake, fluid pressure operated means adapted to control the operation of said track brake, two pipes connected to said fluid pressure operated means, means arranged to be operated when an emergency application of the air brakes is made to cause fluid pressure to flow through one of said pipes to said fluid pressure operated means to effect the operation thereof, means arranged to be operated when a straight air application of the air brakes is made to control the supply of fluid pressure to said fluid pressure operated means through the other pipe, and means for closing the communication between one of said pipes and said fluid pressure operated means when fluid pressure is being supplied to said fluid operated means through the other pipe.

14. In combination, an air brake system, a track brake, fluid pressure operated means for controlling the operation of said track brake, a pipe for supplying fluid pressure to said fluid pressure operated means, said pipe being normally connected to atmosphere, means responsive to an application of the air brakes for closing the connection between said pipe and atmosphere, and manually controlled valve means in said pipe for controlling the supply of fluid pressure through said pipe.

15. In combination, an air brake system, a track brake, fluid pressure operated means for controlling the operation of said track brake, a pipe for supplying fluid pressure to said fluid pressure operated means, valve means in said pipe arranged to be operated in response to an application of the air brakes, and other valve means in said pipe adapted to be operated at the will of the operator.

16. In combination, an air brake system, a magnetic track brake, fluid pressure operated means for controlling the operation of said magnetic track brake, a pipe for supplying fluid pressure to said fluid pressure operated means, valve means responsive to an application of the air brakes for closing the connection between said pipe and atmosphere, and other valve means operable at the will of the operator for controlling the supply of fluid pressure through said pipe when the air brakes are applied.

17. In combination, a straight air brake system, a magnetic track brake, fluid pressure operated means for controlling the operation of said magnetic brake, a pipe for supplying fluid pressure to said fluid pressure operated means, said pipe being normally connected to atmosphere, means responsive to a straight air application of the air brakes for closing a communication between said pipe and atmosphere, and valve means in said pipe operable at the will of the operator.

18. In combination, an air brake system, a magnetic track brake, car door controlling means, control means for effecting the operation of said magnetic track brake when an application of the air brakes is made, and means for rendering said control means inoperative when said car door controlling means is operated to effect the opening of the car doors.

19. In combination, an air brake system, a magnetic track brake, car door controlling means, fluid pressure operated means for controlling the operation of said track brake, valve means arranged to be operated when an application of the air brakes is made to control the supply of fluid pressure to said fluid pressure operated means, and other valve means for controlling the supply of fluid pressure to said fluid pressure operated means arranged to be operated when said car door controlling means is operated to effect the opening of the car doors.

20. In combination, a magnetic track brake, fluid pressure operated means for controlling the energization of said magnetic track brake and the movement thereof relatively to the track, two pipes for supplying fluid pressure to said fluid pressure operated means to effect the operation thereof and a double-check valve connected between said pipes and said fluid pressure operated means for cutting off the communication between one of said pipes and said fluid pressure operated means when fluid pressure is being supplied to said fluid pressure operated means through the other pipe.

21. In combination, an air brake system, a track brake, fluid pressure operated means for controlling the operation of said track brake, a pipe for supplying fluid pressure to said fluid pressure operated means, said pipe being normally connected to atmosphere through a relatively large opening whereby fluid pressure in said pipe cannot build up to a sufficient value to cause said fluid pressure operated means to effect the operation of said track brake, a source of fluid pressure, a manually controlled valve for controlling the communication between said source and said pipe, means responsive to an application of the air brakes for controlling the opening between said pipe and atmosphere so that fluid pressure can build up to a sufficient value to effect the operation of said fluid operated means when communication is established between said source and said pipe.

22. In combination, a straight air brake system, a track brake, fluid pressure operated means for controlling the operation of said track brake, a pipe for supplying fluid pressure to said fluid pressure operated means, said pipe being normally in communication with the atmosphere through a relatively large opening whereby the pressure cannot build up therein to a sufficient value to cause said fluid pressure operated means to effect the operation of said track brake when fluid pressure is supplied thereto, manually operated means for controlling the supply of fluid pressure to said pipe, and means responsive to a straight air application of the air brakes for controlling the communication between said pipe and atmosphere so that fluid pressure can build up in said pipe to a sufficient value to effect the operation of said fluid operated means.

In witness whereof, I have hereunto set my hand this 25 day of Sept. 1926.

CHARLES A. IVES.